Feb. 1, 1955
W. G. CARTTER ET AL
2,700,970
REFLECTOR CONSTRUCTION FOR RADIATING TYPE HEATERS
Filed Oct. 8, 1949
3 Sheets-Sheet 1
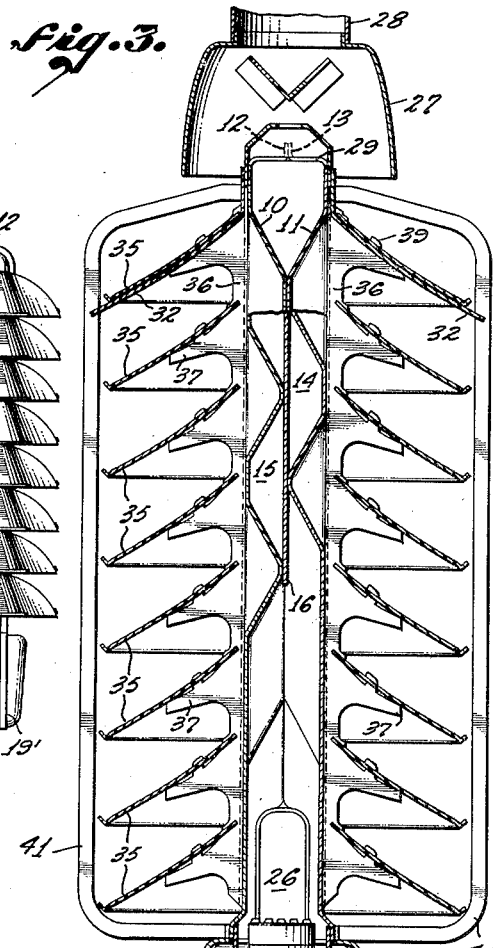
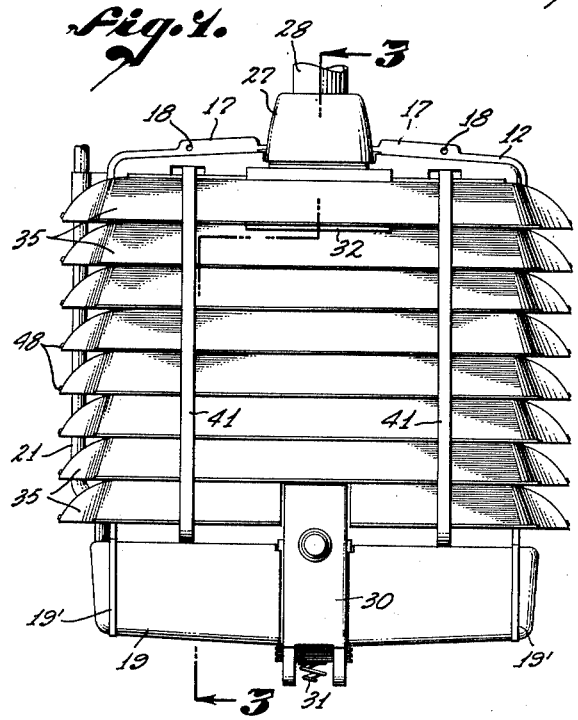
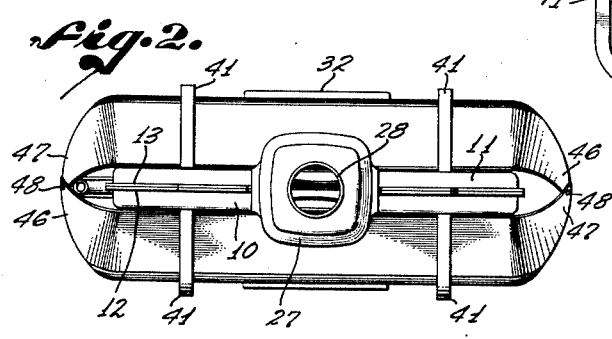
WILLIAM G. CARTTER &
J. RICHARD EWELL,
INVENTORS.
HUEBNER, BEEHLER, WORREL,
HERZIG & CALDWELL,
ATTORNEYS.

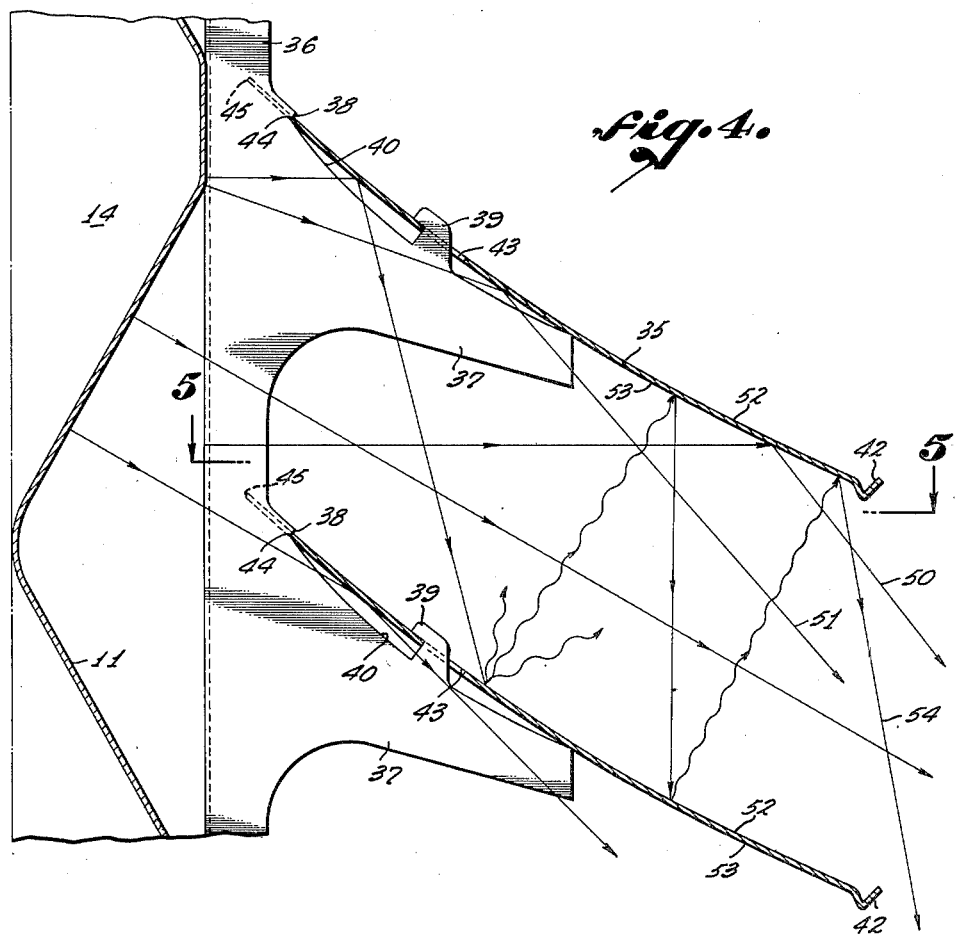
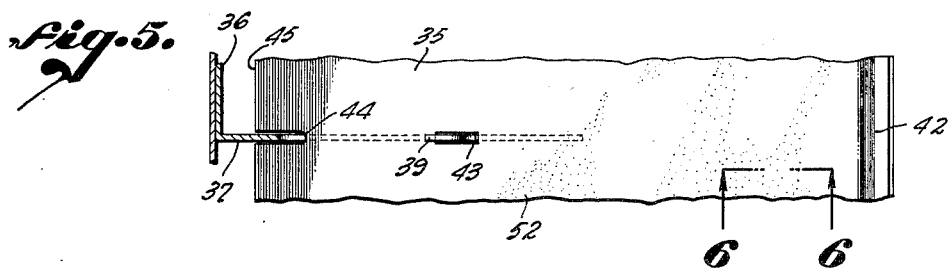
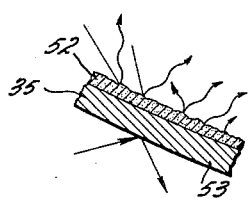
WILLIAM G. CARTTER &
J. RICHARD EWELL,
INVENTORS.
HUEBNER, BEEHLER, WORREL,
HERZIG & CALDWELL,
ATTORNEYS.

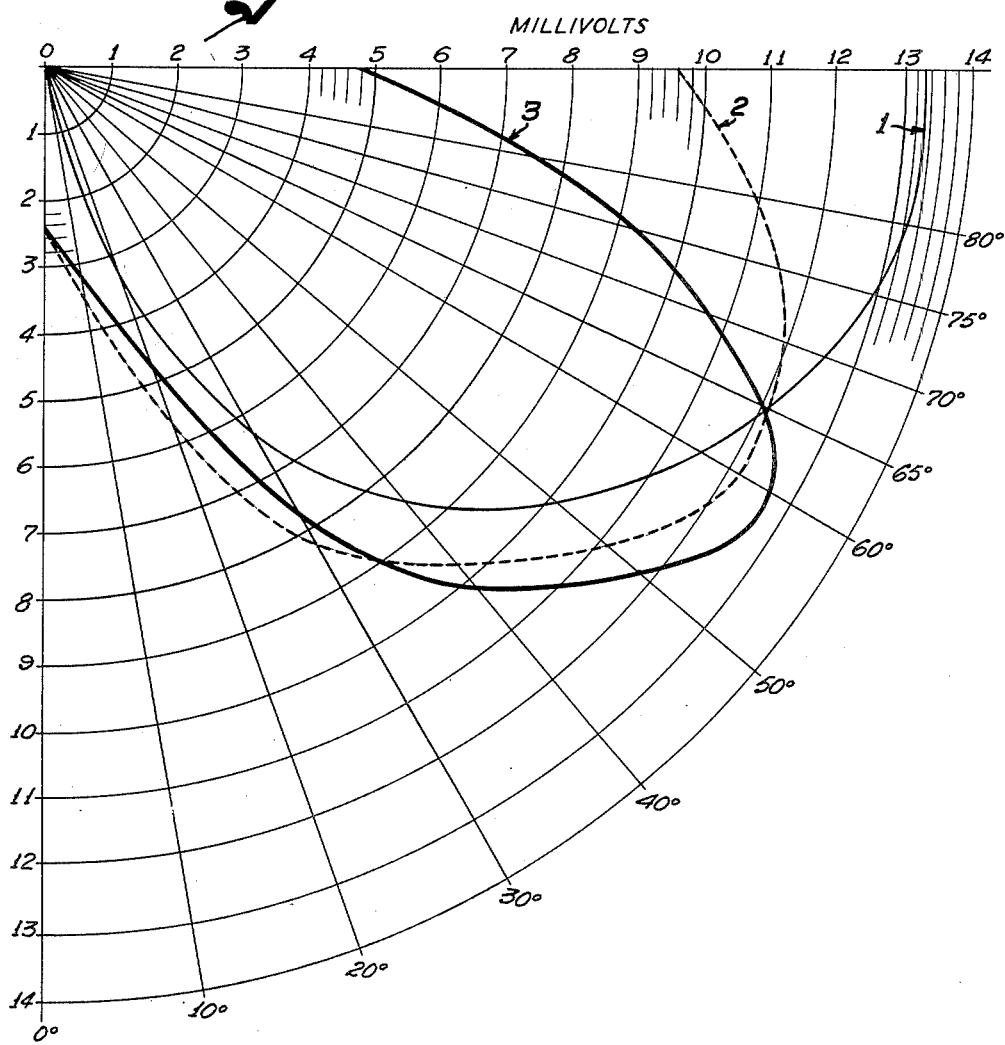

United States Patent Office 2,700,970
Patented Feb. 1, 1955

2,700,970

REFLECTOR CONSTRUCTION FOR RADIATING TYPE HEATERS

William G. Cartter and Joseph Richard Ewell, Monrovia, Calif., assignors, by mesne assignments, to Prat-Daniel Corporation, South Norwalk, Conn., a corporation of New York Application October 8, 1949, Serial No. 120,364

11 Claims. (Cl. 126—91)

The application relates to space heaters and more especially space heaters which depend upon radiant heat for the dispersion of heat energy from a heat source over an area served by the heater. Although the utilization of space heaters depending primarily upon radiation of heat for distribution is an old and well practiced art, it is common knowledge that the measure of efficiency of heaters of this type has regularly fallen far short of an acceptable figure. More especially there has been experienced great difficulty in securing a proper distribution of radiant heat so that the heating effect may be spread uniformly over a desired area. As is almost invariably the case when radiant heat sources have been depended upon in the past, areas directly in front of the heat source are much warmer than areas angularly disposed therefrom which are not warm enough. These circumstances prevail in radiant heaters whether used at floor lever or used at locations suspended above the floor.

In utilizing heaters adapted to heat by radiation, or in fact heaters of any sort, there is a considerable problem in directing the heat uniformly toward the area to be served. When heat is to be distributed by convection currents the natural tendency is for heat to ascend and heat the upper strata of air in the space rather than to descend and heat the lower strata and objects therein where the warming effect is most needed. Because of the natural tendency of convection air currents to rise, heaters designed to heat by direct radiation have been found to fill a need in this field because of the fact that radiant heat can be directed from its source toward the area to be heated or objects in that area, independently of convection air currents.

In radiating heaters heretofore used to some extent for this purpose the diffusion pattern of radiant heat has been extremely limited to a small area immediately adjacent the heater. Even with the use of vanes, louvers or reflectors for reflecting the heat, radiant heat seems to be of such a character that by far the greatest effect is in the area immediately opposite the heat source and that areas disposed otherwise are poorly heated, thereby greatly minimizing the efficiency of devices of this sort. When heaters are suspended, they must naturally be elevated a substantial distance above the floor so that there is head room above them sufficient to permit persons to move under the heaters without coming too close to the source of heat. On the other hand, structural elements in a building often dictate the location of heaters in places disadvantageous to maximum efficiency, whereas if radiant heat could be adequately controlled as to direction, the precise location of the heater would be relatively less material.

It is therefore among the objects of the invention to provide a new and improved heater wherein the pattern of radiant heat is spread with greatly improved uniformity over an area to be heated.

Another object of the invention is to provide a new and improved heater wherein the efficiency of radiant heat distribution is substantially improved and wherein hot spots and cold spots respectively adjacent and distant from the source of radiant heat have been minimized.

Still another object of the invention is to provide a new and improved suspended type of radiating heater wherein the source of radiant heat may be spread over a relatively large area and in a vertical direction if desired, the source of radiant heat being such that radiant heat is diffused therefrom in many directions but which is provided with a special type of reflector whereby the radiant heat is caught and reflected one or more times under sufficiently careful control so that there is a relatively uniform distribution of heat beneath the heater wherein the temperature is not elevated above a desirable maximum at any portion of the area to be heated.

Still another object is to provide a new and improved radiating heater including reflecting vanes of spacial construction so constituted and arranged that the vanes are capable not only of reflecting radiant heat but of re-radiating the heat for a secondary and perhaps even a tertiary reflection.

Also among the objects is to provide a new and improved suspended type radiating heater wherein parts providing a source of radiant heat and the necessary deflecting louvers are maintained substantially at a minimum in order thereby to minimize the unit cost per B. t. u. input and wherein also the heat generation and distribution is greatly improved.

The objects also include the provision of vanes or louvers of improved design easily applied and removed and so proportioned and adjusted when applied that over-intense radiation in any one direction is minimized.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a side elevational view showing one type of heating device with the desired vanes, louvers or reflectors associated therewith in an approved manner.

Figure 2 is a top view of the device shown in Figure 1.

Figure 3 is a vertical sectional view taken on the line 3—3 of Figure 1.

Figure 4 is a fragmentary vertical sectional view showing two vanes or louvers illustrating diagrammatically the path of heat rays radiated from the source of heat.

Figure 5 is a fragmentary sectional view showing the manner of mounting the vanes or louvers.

Figure 6 is a fragmentary vertical sectional view of one of the vanes taken on the line 6—6 of Figure 5 showing diagrammatically the effect of both sides of a vane upon heat rays impinging thereon.

Figure 7 is a reproduction of the chart showing by one curve a substantially maximum desired pattern of heat distribution by utilization of louvers specially constructed with respect to cross-sectional shape, character of reflecting and absorbing surfaces, and directed in an improved manner, together with other curves for comparison, of untreated vanes or louvers, and of a radiant heat source unprovided with vanes or louvers of any kind. Measurements for the curves were taken in a vertical plane through the center of the heater.

Although the principles herein set forth are applicable to virtually any source of radiant heat, an overhead heater has been used as an example. The overhead suspended type space heater herein defined is one customarily mounted some eight feet or more above the surface of the floor and is designed to direct radiant heat downwardly over the floor area so that persons therebeneath are kept comfortably warm. Quite commonly heaters of this type are used in factory space and work space where heaters on the floor surface would interfere with regular use of the space. The heaters may be adapted to spaces of very considerable area inasmuch as the heaters can be used in any number desired and spaced suitably so that the radiant heating effect completely blankets the floor area. As in all heating installations the primary object is even distribution of heat so that all of the area is more or less uniformly heated.

The present disclosure concerns primarily the directing of radiant heat from virtually any radiant heating source by reflection, and re-radiation resulting in a secondary reflection. To this end the particular style of surface from which radiant heat emanates is relatively unimportant since the reflecting scheme will be applicable upon radiating heat from any source. As a matter of convenience and as an aid to the understanding of the principle involved, a suspended type heater is described wherein radiant heat emanates from deformed or recessed plate surfaces spaced one from another to provide heating chambers wherein hot flue gases rising from a burner heat the walls of the chambers.

Specifically there is shown a heating device comprising a pair of plate panels 10 and 11 having flanges 12 and 13 secured together so that there is formed between the plate panels channels 14 and 15 for flue gases. A baffle 16 separates one channel from the other. As illustrated in Figure 1 the flanges 12 and 13 have wide parts 17 at the top for the reception of holes 18 by means of which the heating device can be suspended from the roof rafters or ceiling of a building.

Beneath the plate panels is a casing or housing 19 enclosing a chamber 20 within which are located a portion of a supply pipe line 21 and the lower portion 22 of burners 23 to which the pipe line is attached. Straps 19' may be used to secure the housing or casing 19 to the plate panels. Openings 20' provide a passage for air into the chamber 20. An interior housing 24 surrounds the burners 23 providing a combustion air supply chamber 25 which opens upwardly directly into a combustion space 26 above the burner outlets.

At the top of the plate panels 10 and 11 there is provided a draft hood 27 which opens upwardly into a flue 28 which is adapted to conduct off products of combustion passing upwardly through an open top 29 of the plate panels.

For convenience the burners may be provided with a thermostat control enclosed in a housing 30 equipped with a thermo-responsive bulb 31 beneath the housing or casing 19 in a position wherein air circulated toward the heater by a draft produced therein is drawn past the thermo-responsive bulb in order to control operation of the heater.

To control the direction of radiant heat emanating from the plate panels there is provided a series of louvers, vanes or reflectors identified individually by the reference character 35. These vanes may be the same for both sides of the heater. In order to secure the vanes in place there is provided on each side of the heater a pair of vertical columns 36 attached to the adjacent plate panel, each column of which is provided with a series of tilted brackets 37 spaced vertically one from another, the vertical spacing here being shown to be equal. At the inner end of each bracket is a shoulder 38 and on the top edge is an inwardly directed hook 39. As will be best seen in Figure 4 an upper edge 40 of each bracket is curved downwardly at a radius greater than the radius of curvature of the vane 35 when secured thereon. A pair of straps 41 on each side of the heater extends from the upper portions of the plate panels around the outer edges of the vanes and inwardly into engagement with the bottom portions of the plate panels where the straps are attached to the casing or housing 19.

It has been found advantageous to employ what may be termed a shield or hood 32 located beneath the uppermost vane 35 on each side, the shield or hood being extended outwardly beyond the outer edge of the vane and located centrally with respect to the adjoining plate panel so that the location of the shield or hood is about at the area of the vent. Employment of the shield or hood thus described is a factor in governing the flow of heated air into the draft hood to the end that the efficiency of the heating effect of the radiating heater may be improved.

The vanes may ordinarily be constructed of a flat strip of resilient metallic material preformed if need be by some conventional stamping process to a slight degree of curvature and impressed with beads 42 at the outer perimeters. The vanes have rectangular apertures 43 therein, as illustrated in Figures 4 and 5, and have transverse slots 44 at inner edges 45 of the vanes in alignment with the apertures 43. By this device the vanes 35 may be releasably snapped into place without the necessity for any permanent fastening device. From an examination of Figures 4 and 5 it will become apparent that to place the vanes in position it is necessary initially to press the inside edge 45 of each vane against its respective shoulder 38 simultaneously depressing the mid-portion of the vane downwardly in the form of a curve sufficient to allow the hook 39 to extend through the aperture 43. The vane in each case being of resilient material can then be released and will spring back into position shown in Figure 4 wherein the inner edge of the aperture 43 engages beneath the hook.

To further secure the vanes in place vanes at corresponding levels on opposite sides of the plate panels are provided with triangularly pointed ends 46 and 47. These ends may be extended around the end faces of the plate panels and there joined together by means of a pressed rivet 48 or some similar means of attachment. The spacing of the vanes one from another, while not being extremely critical, should nevertheless be sufficient so as not to impair radiation of heat outwardly between the vanes from the plate panels nor the re-radiation or reflection of heat outwardly which in its passage impinges upon one side of the vane or another. For convenience in manufacture spacing of the vanes may be uniform between the top and bottom of the plate panels.

By the provision of detachable vanes of the type herein described it is possible to remove damaged or deteriorated vanes by merely pressing the mid-portion of the vane downwardly against the bracket 37 and thereupon disengaging the slot 44 from its engagement with the shoulder 38. The employment of press rivets makes possible the ready disengagement of the ends of vanes opposite each other so that either or both vanes can be readily removed. Moreover because of the type of attachment shown and described, it is possible to use vanes of somewhat different width and configuration with the same heater and attaching columns and brackets without making substantial changes in the structure of the heater or the brackets.

With respect to the vane arrangement and its relationship to the plate panels from which radiant heat emanates, it has been found particularly advantageous to provide vanes 35 having a substantial width and also to arrange the tilt of the vanes such that a horizontal plane located at the lowermost portion of the bead 42 strikes the vane 35 next below either at or below the inside edge which lies immediately adjacent the source of radiant heat. Arranged in this manner the vanes are positioned to intercept the direct radiation of heat from the source of radiant heat which passes in a horizontal direction outwardly and is a material influence in directing a desired proportion of the radiant heat downwardly to avoid dispersion in a horizontal direction where it will do the least amount of good. An appreciation of the extent of coverage of the vanes over the panels forming the source of heat can be gained from Figure 1 where it will be apparent that the vanes completely hide the panel when viewed horizontally from the side or the end. Although there may be a slight exposure at the ends in this position, such loss as might occur from radiation in a horizontal direction is not material.

To further facilitate and improve the efficiency of the vanes and their use in connection with a radiating heater of the type described, the undersides of the vanes in each instance are preferably provided with a bright, smooth, metallic reflecting surface to the end that substantially all of the radiant heat striking the surface is reflected or directed eventually downwardly or outwardly and downwardly between heat reflecting surfaces of the vanes. The paths 50 and 51 of radiant heat rays emanating from the plate panel have been traced in Figure 4.

Ordinarily if both sides of the vanes were reflecting surfaces, a substantial portion of heat impinging upon the surface of the vane in each case would be reflected outwardly or perhaps upwardly with respect to the location of the radiating heater. Radiant heat striking the upper surfaces of the vanes even after reflection in the first instance from the bottom side of adjacent vanes would have a tendency to be re-reflected outwardly and upwardly. To minimize the reflection and re-reflection of radiant heat outwardly in an undesired horizontal direction, the upper sides of the vanes are treated or coated with a heat absorbing surfacing material 52 preferably somewhat rough in texture. The heat absorbing material will in each case be on the side of the vane opposite from a bright metallic heat reflecting surface 53. Treatment of the vanes in this way utilizes for a practical purpose the principle that radiant heat is reflected mirror-like from a polished surface whereas radiant heat falling upon an opaque or heat absorbent surface is absorbed by the surface. The fact still remains, however, that when a substantial quantity of heat is absorbed by a heat absorbing surface it will be re-radiated outwardly though not reflected. As shown in Fig. 6, re-radiation from the dark roughened surface 52 is in random directions, with the highest radiation intensity being on a line normal to the vane surface. Radiation intensity will in general be symmetrical on each side of the normal line, so that the average total radiation direction will also lie on a line normal to the vane. This is shown in Fig. 4 by the wiggly lines extending across the gap from the dark top surface 52 to the bright under surface 53. The heat will thereafter be reflected a second or third time in a generally outwardly direction until, as in the example of the ray 54, it is directed downwardly toward the room to augment the effect of heat radiated directly from the plate panels by a single reflection from the bright lower surfaces of the vanes.

As an indication of the improved effect of the vanes, louvers or reflectors herein described in controlling the radiation of heat emanating from vertically positioned plate panels, there is shown in Figure 7 a set of curves which reproduces the relative temperatures at different positions angularly with respect to a transverse vertical plane at the center of the heater. The curves form a basis of comparison first for a heater with no vanes as in the case of curve No. 1, next for a heater with vanes having reflecting surfaces on both sides as in the case of curve No. 2, and finally for a heater of preferred design as in the case of curve No. 3 where the upper surface is of heat absorbing character. The readings from which the curves have been computed were taken on a vertical plane perpendicular to one of the plate panels at a center position intermediate the ends.

The readings given on the curves are in millivolts which are readily translatable into temperature readings if the need arises but which can be plotted in millivolts for the sake of comparison. In each case the conditions were precisely the same with respect to room temperature and heat input of the heater. Circumstances represented by the curves are those commonly experienced wherein the room temperature averages about 83° F. and with a heater having an input of 103,000 B. t. u.'s.

Curve No. 1 represents the radiant heat pattern without any louvers on the heating source. The maximum amount of radiant heat was emitted when the instrument was directly in front of the heating element, namely, along a horizontal line. As the instrument was moved downwardly into an area wherein heat should be passed in order to heat the room below the heater, the intensity of radiant heat decreased as shown by curve No. 1, reaching a minimum value of almost zero directly beneath the heater. From this curve it will be apparent that the maximum radiant heat effect of an overhead heater is horizontal to the heater in an area least desirable and that the radiant heat emitted downwardly is considerably less.

The above recited conditions are improved by the use of vanes arranged as heretofore described. Curve No. 2 represents the heat pattern where vanes are used and mounted as described herein. In this case the maximum radiant intensity occurred at an angle of 60 to 65 degrees from the vertical. It should also be noted that over an area from zero to 65 degrees, curve No. 2 falls well below curve No. 1, thereby indicating a marked increase in radiant heat emanated throughout this angular distance below the heater. From 65 degrees to 90 degrees curve No. 2 falls inside curve No. 1, representing a decrease in radiant rays passing outwardly in a somewhat horizontal direction. This is the direction least desirable and consequently heat lost by heat radiated horizontally into the upper portion of the space to be heated is substantially lessened by the use of properly constructed vanes.

There is, however, as indicated by curve No. 2, a considerable remaining radiation of heat outwardly in a substantially horizontal direction. This is greatly improved by treating the upper surfaces of the vanes as by etching, painting or by some similarly appropriate means so as to render the upper surfaces dark or opaque and somewhat roughened. The same radiating heater and vane structure with the heat absorbing treatment on the upper sides of the vanes was productive of a heat pattern as indicated by curve No. 3. An examination of curve No. 3 reveals that the emanation of radiant heat in a direction substantially horizontal has been greatly minimized and the heat thus saved has been added to the accumulation of heat radiating in an obliquely downwardly direction between zero and 60 degrees. This change is brought about by the fact that radiating heat rays obey the same laws as light traveling in straight lines and adapted to reflect as light rays are reflected by a mirror with the angle of incidence being equal to the angle of reflection. The phenomenon of curve No. 3 may be further explained by the fact that when radiant rays strike the heat absorbing upper surfaces, they are absorbed rather than reflected but in being absorbed build up heat upon the surface which is emanated again as radiant heat in a variety of different directions. Although some small portion of the re-radiated heat may be passed off in an undesired direction, nevertheless a very substantial quantity will be re-radiated by the roughened surface in a direction such that it will impinge against the heat reflecting lower surfaces of vanes immediately above the heat absorbing surfaces and thereupon be reflected outwardly and downwardly so as to augment the directly reflected radiant heat from the heat reflecting surfaces. The apparent loss indicated in the total quantity of heat may be explained by the fact that although there may be a loss in radiant heat, the apparatus will be heated up and the heat eventually will find its way into the space as convected heat.

Regardless of any loss in heat of the kind referred to, the increase in the quantity of radiant heat at precisely the desired location is of an extremely material value in that the increased radiation falls directly upon persons in the area heated and also upon objects in the heated area so that the persons are comfortably heated and so that the objects are enabled to absorb radiant heat to the end that the comfort range within the space served by the heater is greatly enhanced. As may be inferred in this description, some variation may become advisable with variations in intensity, with the nature of the heat source, the number of vanes used, the distance of the heat source above the floor and perhaps the character of the surfaces of the plate panels and other factors. The principle described, however, points to a greatly improved radiant heating effect by the use of vanes tilted generally in the direction disclosed and provided where a heat pattern of the type shown in Figure 3 is desired with heat absorbing surfaces on the upper sides of the vanes.

The minimization of the quantity of heat radiated in a horizontal direction may be further appreciated when it is understood that as viewed in Figure 1 the only surface portions of the vanes visible are the surface portions coated with a heat absorbing material so arranged that no portion of the heat radiating hot plate is exposed. Therefore only persons and objects located below the hot plate and in a direct line of vision with respect to the hot plate are in a position to receive radiant heat directly from the hot plate without any intermediate reflection. Because of the arrangement shown and described the heated subjects and areas thus arranged are in a most favorable position to be benefited by the heater, the whole heater and vane construction being designed with this end in view.

While the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having herein described the invention, what is claimed as new and desired to be secured by Letters Patent is:

1. In a radiating type heater the combination of a hot plate providing a source of radiant heat, a series of deflecting vanes of arcuate cross-sectional shape in spaced parallel arrangement, said vanes having inside edges adjacent the hot plate and fasteners for the vanes comprising spaced parallel brackets securely mounted with respect to the hot plate having depressed arcuate vane receiving edges of smaller radius of curvature than the arc of the vanes, a shoulder near one end of each depressed arcuate vane receiving edge and a hook intermediate the ends of each arcuate vane receiving edge directed toward the shoulder, each vane having a portion at the inside edge thereof adapted to engage the shoulder and an aperture adapted to pass over the hook and being adapted to engage beneath the hook at one edge of the aperture.

2. In a radiating type heater the combination of a hot plate providing a source of radiant heat, a series of deflecting vanes in spaced parallel arrangement, said vanes having inside edges adjacent the hot plate and outside edges displaced from a plane perpendicular to the hot plate at the respective inside edges extending around the ends of the hot plate and adapted to engage ends of correspondingly located vanes on the other side of the hot plate, fasteners for the vanes comprising spaced parallel brackets securely mounted with respect to the hot plate having depressed arcuate vane receiving edges, a shoulder near one end of each depressed arcuate vane receiving edge and a hook intermediate the ends of each arcuate vane receiving edge directed toward the shoulder, each vane having a portion at the inside edge thereof adapted to engage the shoulder and an aperture in line therewith adapted to pass over the hook and being adapted when subject to the spring-back of the vane after being depressed against the arcuate vane receiving edge of the bracket to engage beneath the hook at one edge of the aperture in releasable vane retaining position.

3. In a radiating type heater the combination of a hot plate providing a surface source of radiant heat, a series of deflecting vanes of arcuate cross-sectional shape in spaced parallel arrangement on each side of the hot plate, said vanes having inside edges adjacent the hot plate, outside edges displaced from a plane perpendicular to the hot plate at the respective inside edges and end portions having a reversely curved arcuate cross-section extending around the ends of the hot plate and adapted to engage ends of correspondingly located vanes on the other side of the hot plate, fasteners for the vanes comprising spaced parallel brackets securely mounted with respect to the hot plate having depressed arcuate vane receiving edges of smaller radius of curvature than the arc of the vanes, a shoulder near one end of each depressed arcuate vane receiving edge and a hook intermediate the ends of each arcuate vane receiving edge directed toward the shoulder, each vane having a slot at the inside edge thereof adapted to engage the shoulder and an elongated aperture in line therewith adapted to pass over the hook and being adapted when subject to the spring-back of the vane after being depressed against the arcuate vane receiving edge of the bracket to engage beneath the hook at one edge of the aperture in releasable vane retaining position.

4. In a heater, the combination of a heat receiving member having a heat radiating face, means to supply heat to said member, and a plurality of vanes in front of and parallel to said face and spaced from each other and in parallel arrangement, the respective sides of said vanes facing in one direction being predominantly heat reflective, the respective opposite sides of said vanes being predominantly heat absorptive.

5. In a heater, the combination of a heat receiving member having a heat radiating face, means to supply heat to said member, and a plurality of vanes in front of and parallel to said face and spaced from each other and in parallel arrangement, said vanes being tilted obliquely with respect to said face and having a predominantly heat reflective surface on one side facing in one direction, and a predominantly heat absorptive surface on the other side facing in the opposite direction.

6. In a heater, the combination of a heat receiving member having a heat radiating face, means to supply heat to said member, and a plurality of thin vanes, each having an edge disposed substantially parallel to said face, said edges being substantially parallel to each other, said vanes extending obliquely away from said face so as to present interior surfaces faced generally toward said radiating member and opposite, exterior surfaces faced generally away from said radiating member, said interior surfaces being predominantly heat reflective, said exterior surfaces being predominantly heat absorptive.

7. In a heater, the combination of a heat receiving member having a substantially vertical heat radiating face, means to supply heat to said member, and a plurality of vertically spaced substantially parallel vanes each having an inner edge lying in a substantially horizontal plane, said inner edges being disposed adjacent and parallel to said face, said vanes extending downwardly and outwardly from their respective inner edges, the under surfaces of said vanes being predominantly heat reflective and the upper surfaces of said vanes being predominantly heat absorptive.

8. In a heater, the combination of a heat receiving member having a heat radiating face, means to supply heat to said member, and a plurality of vanes disposed in front of and parallel to said face and in parallel arrangement, said vanes having inside edges substantially paralleling said face and each other, said vanes extending obliquely away from said face whereby the exterior surface of each of said vanes faces generally away from said face while the opposite, interior surface of the vane faces generally toward said face, the exterior surfaces of said vanes being concave and predominantly heat absorptive, and the interior surfaces being convex and predominantly heat reflective.

9. In a heater, the combination of a heat receiving member having a substantially vertical heat radiating face, means to supply heat to said member, and a plurality of vanes spaced from and disposed in front of and parallel to said face and in parallel arrangement, each vane having an inside edge positioned in a substantially horizontal plane, each of said vanes extending downwardly and outwardly from said inside edge and terminating in an outside edge, said vanes being disposed to intercept, on the under surfaces of said vanes, all horizontal radiation from said vertical face, the under surface of each of said vanes being predominantly heat reflective and the upper surface being predominantly heat absorptive.

10. In a heater, the combination of a housing comprising side walls forming a heat exchange chamber open at top and bottom for the upward passage of combustion gases, said side walls being substantially imperforate thereby to contain within said chamber said combustion gases in their upward passage, a burner disposed adjacent the bottom of said chamber, flue means disposed at the top of said chamber, and a plurality of vanes spaced from said housing in vertically spaced parallel arrangement, each vane having an inside edge disposed in a substantially horizontal plane, each said vane extending downwardly and outwardly from its respective inside edge and terminating in an outside edge, the tilt and spacing of said vanes being such that a horizontal plane intersecting any of said inside edges intercepts a portion of the vane next above, the respective under surfaces of said vanes being predominantly heat reflective and the upper surfaces being predominantly heat absorptive.

11. In a heater, the combination of a generally flat, vertically disposed heat receiving member having end edges and having therearound a heat radiating face, means for supplying heat to said member and a plurality of horizontally extending, parallel vanes spaced vertically around said member, each of said vanes being elongate and relatively thin and each disposed with an inside longitudinal edge spaced from and parallel to one of the two flat faces of said member, each of said vanes extending transversely downward and outward from said member, the ends of corresponding vanes on opposite sides of said member being secured together opposite end edges of said member, thereby to form a series of vane means spaced vertically and extending completely around said radiating member, said vanes being so disposed that a horizontal plane intersecting any of said inside edges intercepts the vane next above, the upper surfaces of said vanes being predominantly heat absorptive and the lower surfaces being predominantly heat reflective.

References Cited in the file of this patent

UNITED STATES PATENTS

| | | |
|---|---|---|
| D. 160,939 | Greene | Nov. 21, 1950 |
| 1,623,634 | Pape | Apr. 5, 1927 |
| 2,041,226 | Chadwick | May 19, 1936 |
| 2,516,285 | Winkler et al. | July 25, 1950 |
| 2,522,935 | Farrall | Sept. 19, 1950 |
| 2,594,608 | Cartter | Apr. 29, 1952 |

FOREIGN PATENTS

| | | |
|---|---|---|
| 508,666 | France | July 30, 1920 |
| 429,897 | Great Britain | June 7, 1935 |